May 21, 1968     L. J. BUFFINGTON     3,384,260

SECTIONAL TRAY

Original Filed Sept. 27, 1963

INVENTOR.

Larry J. Buffington

United States Patent Office 3,384,260
Patented May 21, 1968

3,384,260
SECTIONAL TRAY
Larry J. Buffington, Rte. 1, Box 338,
Bauxite, Ark. 72011
Continuation of application Ser. No. 312,030, Sept. 27, 1963. This application Apr. 6, 1966, Ser. No. 540,535
3 Claims. (Cl. 220—17)

ABSTRACT OF THE DISCLOSURE

A multi-compartment food serving tray with an outer circular main container or tray base, which is upwardly open and forms a chamber for the reception of a number of sector shaped bowls which are removably positioned within the main container or tray. Each sector shaped bowl has an outwardly extending lifting lip on its outer end, and the inner ends of all bowls converge to terminate at their arcuate shaped inner ends so that a space is formed between all bowl inner ends, and they all have a recess at their inner ends to allow insertion of a finger to lift them individually with the aid of the lifting lip at their outer ends.

Figure 1:
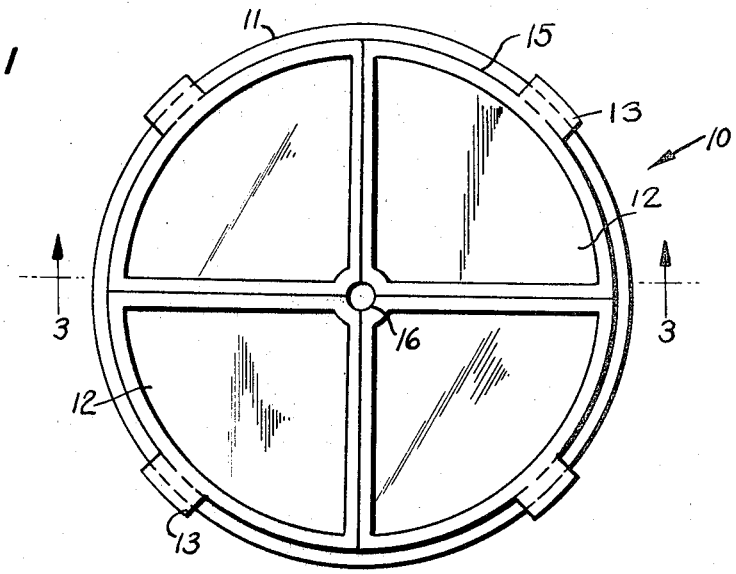

This application is a continuation of application Ser. No. 312,030, filed Sept. 27, 1963, now abandoned.

This invention relates to kitchen trays, and more particularly to the tray including a plurality of bowls for serving different kinds of foods in one tray.

It is therefore the main purpose of this invention to provide a sectional tray adapted to serve food of different kinds from separate bowls which are removably positioned within a tray.

Another object of this invention is to provide a sectional tray which is of compact construction and is designed to save space on the cabinet shelves, in the refrigerator, or on the table.

Another object of this invention is to provide a sectional tray which may be used during picnicking, camping and other outdoor activities.

Still another object of this invention is to provide a sectional tray which, after removal of the bowls, may be used as a serving plate, frying pan, food container, etc.

Still another object of this invention is to provide a sectional tray which is inexpensive to manufacture, of rigid construction, easily washable, and provides maximum utility to its user.

Other objects and advantages of this invention will become apparent from a consideration of the following detailed description taken in connection with the accompanying drawing, wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 shows the top plan view of this invention.

Figure 2:
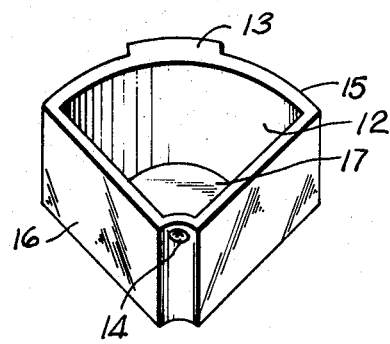

FIGURE 2 relates to a bowl removed from the invention.

Figure 3:
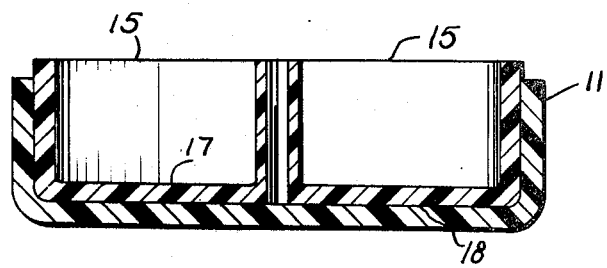

FIGURE 3 is a sectional side view taken along the lines 3—3 of FIGURE 1.

According to this invention, a sectional tray 10 is of a substantially circular configuration and is provided with a circular container 11 preferably made of lightweight plastic or metallic material. A plurality of sector shaped bowls are removably positioned on said circular container.

Each bowl 12 is provided with an outwardly extending handle 13 which is integrally secured to the top portion of a convex, arcuate end portion 15. A pair of straight edge side walls 16 converge from the end portions of said arcuate member 15 and terminate at a concavely arcuate inner end 16. The bottom portion 17 of said bowl 12 is adapted to snugly abut the inner bottom portion 18 of the container 11. Like the circular container 11, each of bowls 12 are made of washable plastic or metallic material and are conveniently received within the container 11 or removed therefrom.

Looking now at the drawing, one will see that, in operation, each sector shaped bowl is adapted to hold a variety of foods in their heated or cold condition. When it is desired to remove a bowl from the container 11 a finger or an implement, such as, fork is inserted into the recess 14 of the concavely arcuate inner end 16 and the handle 13 extending from the end portion 15 is also grasped thereby allowing bowl 12 to be raised from the container 11.

It will also be noted that the above explanation shows the preferred embodiment of this invention, as it will be obvious to those skilled in the art that modifications may be made without departing from the spirit and scope of this invention.

What I now claim is:

1. A sectional tray comprising, in combination, a circular, open ended container, said container having a bottom and an upstanding circumferential wall, a plurality of sector shaped bowls removably positioned within said container, said each bowl being provided with a convex, arcuate outer end portion adapted to abut the circumferential wall of said container, a pair of straight edge, side walls converging from said end portion, a concavely arcuate inner end supported by the end portions of said converging side walls, whereby said concavely arcuate inner ends form a central opening of circular configuration, a bottom portion supporting said end portion, said converging side walls and said concavely arcuate inner end, said concavely arcuate inner end being provided with a recess adjacent the upper edge and a handle member extending outwardly from said outer end portion thereby, in conjunction with said recess of said inner end, being adapted to provide grasping means for removal of said bowl from said container.

2. The combination according to claim 1, wherein said handle member of said each bowl being designed to extend outwardly from the wall portions of said container when said bowl being positioned therein.

3. The combination according to claim 1, wherein said container and said each bowl are made of lightweight, heat absorbing material for sake of improving the safety factor of said sectional tray.

References Cited

UNITED STATES PATENTS

| 923,445 | 6/1909 | Rose | 220—23.4 |
| 1,470,199 | 10/1923 | Small | 220—16 XR |
| 1,768,976 | 7/1930 | Cuthbertson | 220—17 |
| 2,571,111 | 10/1951 | Clark | 220—17 XR |
| 2,974,821 | 3/1961 | Lamont | 220—23.4 |

THERON E. CONDON, Primary Examiner.

DONALD F. NORTON, Examiner.

G. E. LOWRANCE, Assistant Examiner.